United States Patent [19]

Itoh et al.

[11] Patent Number: 4,818,601
[45] Date of Patent: Apr. 4, 1989

[54] RUBBER-CORD COMPOSITE BODIES

[75] Inventors: Michio Itoh, Kodaira; Tadashi Saito, Tokyo; Nobuyuki Okamura, Kodaira; Hisao Yamamoto, Higashimurayama; Yutaka Iseda, Tachikawa; Hirohiko Takagi, Higashiyamato, all of Japan

[73] Assignee: Bridgestone Corporation, Tokyo, Japan

[21] Appl. No.: 153,897

[22] Filed: Feb. 9, 1988

[30] Foreign Application Priority Data

Feb. 20, 1987 [JP] Japan ................................. 62-35924

[51] Int. Cl.$^4$ ................................................ B32B 5/06
[52] U.S. Cl. ..................................... 428/297; 156/330; 525/108; 525/109; 428/392; 428/395; 428/396; 428/414; 428/415; 428/416

[58] Field of Search ............... 428/297, 392, 395, 396; 525/108, 109

[56] References Cited

U.S. PATENT DOCUMENTS 3,775,150  11/1973  McClary ............................ 525/109

Primary Examiner—Theodore E. Pertilla
Attorney, Agent, or Firm—Sughrue, Mion, Zinn, Macpeak, and Seas

[57] ABSTRACT

A rubber-cord composite body used for cord reinforcing rubber articles is produced by embedding fiber cords treated with an epoxy compound and further with a particular resorcin-formaldehyde-rubber latex adhesive into a particular rubber composition containing 0.5~10 parts by weight of each of a bismaleimide compound and sulfur.

7 Claims, No Drawings

RUBBER-CORD COMPOSITE BODIES

BACKGROUND OF THE INVENTION

1. Field of the Invention

This invention relates to a rubber-cord composite body consisting of a cord for rubber reinforcement such as organic fiber cord, inorganic fiber cord or the like and a rubber composition. More particularly it relates to a technique for improving a bonding property between rubber and cord in the rubber-cord composite body.

2. Related Art Statement

In a rubber-cord composite body consisting of a cord for rubber reinforcement subjected to an adhesion treatment and a vulcanizable rubber composition, there is no problem under ordinary use conditions because the breakage is not caused at a bonding boundary between rubber and cord. Recently, however, the rubber-cord composite bodies have been used under severer use conditions together with the increase of demand in tires for vehicles running under heavy load over a long distance, tires for vehicles running at higher speed, belts and hoses used at higher temperature and the like. Therefore, it is desired to further improve the bonding force between rubber and cord in these cord reinforced rubber articles.

Among the rubber reinforcing cords, it is known that rubber-cord composite bodies obtained, for example, by treating nylon or rayon fiber cords with an adhesive of resorcin·formaldehyde/rubber latex (hereinafter referred to as an RFL adhesive) have a sufficiently strong bonding force. However, polyethylene terephthalate fiber, polyethylene naphthalate fiber, aramid fiber (for example, Kevlar made by DuPont, Tecnola made by Teijin Limited as a trade name), aromatic polyester fiber, heat resistant fiber having a heterocyclic ring and so on have a rigid skeleton structure, so that they are poor in the affinity with the RFL adhesive. Therefore, the latter fibers are generally treated with an epoxy compound before the treatment with the RFL adhesive or with a resorcin-excessive RFL adhesive having a mol ratio of resorcin or resorcin derivative to formaldehyde of not less than 1.

Furthermore, it has been attempted to treat a non-plated metallic fiber or inorganic fiber such as glass fiber, ceramic fiber or the like with an epoxy compound and further with the RFL adhesive for adhering to rubber.

By the adhesion treatment with the epoxy compound and RFL adhesive, or the adhesion treatment with the resorcin-excessive RFL adhesive was obtained a sufficiently satisfactory bonding force.

However, the rubber-cord composite body is now required to have a very high bonding force, so that the conventional bonding force becomes insufficient under the aforementioned severer conditions. For this reason, it has been attempted to incorporate an adhesion component consisting of methylene acceptor and methylene donor into a rubber composition adjoining the adhesion-treated cord, but there is a drawback that such an adhesion component is resinified in the vulcanized rubber composition to loose the rubbery elasticity and deteriorate the heat build up of rubber.

SUMMARY OF THE INVENTION

It is, therefore, an object of the invention to solve the above mentioned drawbacks and provide rubber-cord composite bodies having a bonding force capable of sufficiently withstanding deterioration even under severe use conditions.

The inventors have made various studies in order to solve the above drawbacks and found that rubber-cord composite bodies having very high bonding forces at room temperature and high temperature can be obtained by vulcanizing a combination of cords for a rubber reinforcement treated with a particular treating agent and a rubber composition containing particular amounts of bismaleimide compound and sulfur under pressure, and as a result the invention has been accomplished.

According to the invention, there is the provision of a rubber-cord composite body, characterized in that fiber cords for rubber reinforcement treated with an epoxy compound and further with an RFL adhesive having a mol ratio of resorcin to formaldehyde (R/F) of less than 1.0 (mol amount of resorcin/mol amount of formaldehyde <1.0) are embedded in a rubber composition containing 0.5~10 parts by weight of a bismaleimide compound and 0.5~10 parts by weight of sulfur based on 100 parts by weight of starting rubber.

Moreover, when using a resorcin excessive RFL adhesive having an R/F mol ratio of not less than 1.0, the rubber-cord composite body according to the invention may be obtained by embedding fiber cords directly treated with the RFL adhesive without treatment of an epoxy compound in the above mentioned rubber composition.

DESCRIPTION OF THE PREFERRED EMBODIMENTS

The RFL adhesive used in the invention is the same as in the ordinary rubber industry. The term "resorcin" means to include resorcin and resorcin derivatives such as methylresorcin, a formaldehyde reaction product of resorcin with chlorophenol, aminophenol, oxybenzoic acid or the like, a reaction product of resorcin with sulfur chloride, and so on. The term "rubber latex" means vinyl pyridine-styrene-butadiene copolymer latex (VP latex), styrene-butadiene copolymer latex (SBR latex), carboxy-modified latex, natural rubber latex and so on.

The starting rubber used in the invention includes natural rubber, synthetic rubber such as polyisoprene rubber, polybutadiene rubber, styrenebutadiene copolymer rubber, butyl rubber, halogenated butyl rubber or the like, and a blend thereof. Particularly, the natural rubber alone or a blend of natural rubber and synthetic rubber is preferable.

The bismaleimide compound according to the invention includes all of compounds represented by the following general formula:

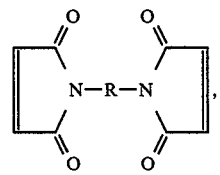

wherein R is an aromatic, aliphatic or alicyclic hydrocarbon residue. It it not particularly restricted and may include as follows:

N,N'-ethylene bismaleimide,
N,N'-hexamethylene bismaleimide,

N,N'-dodecamethylene bismaleimide,
N,N'-(2,2,4-trimethyl-hexamethylene) bismaleimide,
N,N'-(oxy-dipropylene) bismaleimide,
N,N'-(amino-dipropylene) bismaleimide,
N,N'-(ethylene-dioxydipropylene) bismaleimide,
N,N'-(1,4-cyclohexylene) bismaleimide,
N,N'-(1,3-cyclohexylene) bismaleimide,
N,N'-(methylene-1,4-dicyclohexylene) bismaleimide,
N,N'-(isopropylidene-1,4-dicyclohexylene) bismaleimide,
N,N'-(m-phenylene) bismaleimide,
N,N'-(p-phenylene) bismaleimide,
N,N'-(o-phenylene) bismaleimide,
N,N'-(1,3-naphthylene) bismaleimide,
N,N'-(1,4-naphthylene) bismaleimide,
N,N'-(1,5-naphthylene) bismaleimide,
N,N'-(3,3'-dimethyl-4,4'-biphenylene) bismaleimide,
N,N'-(3,3'-dichloro 4,4'-biphenylene) bismaleimide,
N,N'-(2,4-pyridyl) bismaleimide,
N,N'-(2,4-toluylene) bismaleimide,
N,N'-(2,6-toluylene) bismaleimide,
N,N'-(4,6-dimethyl-1,3-phenylene) bismaleimide,
N,N'-(4,4'-diphenylmethane) bismaleimide,
N,N'-(4,4'-diphenylether) bismaleimide,
N,N'-(4,4'-diphenylsulfone) bismaleimide,
N,N'-(4,4'-diphenyldithio) bismaleimide,
N,N'-(1,4-butanediol bis-3-aminopropyl ether) bismaleimide,
N,N'-(1,4-ethanediol bis-3-aminopropyl ether) bismaleimide,
N,N'-(p-diamino diphenyl ether) bismaleimide; and a mixture thereof.

Moreover, a vulcanization accelerator, an accelerator activator, an antioxidant, a softening agent, a filler and the like may properly be compounded in the rubber composition according to the invention in addition to sulfur as a vulcanizing agent.

The resorcin excessive RFL adhesive improves the affinity to fiber and is easy to diffuse the RFL oligomer into fiber molecule, so that the bonding force can be improved. However, the resinification of the RFL adhesive is insufficient, so that the improvement of the bonding force above a certain value can not be expected even when using various resorcin derivatives or formaldehyde derivatives, or when changing the mol ratio of R/F. On the other hand, in case of using the epoxy compound treatment together with RFL adhesive treatment, the bonding force is somewhat improved by the use of various epoxy compounds, or the high bonding force can not be obtained by treating with an adhesive consisting of epoxy compound and epoxy curing agent in the epoxy compound treatment.

On the contrary, the rubber-cord composite body according to the invention is very high in the bonding force as compared with the aforementioned cases, which is considered due to the following reasons. That is, the adhesion in the rubber-cord composite body according to the invention is achieved by bonding cord - adhesive - rubber to each other. At first, the bonding between cord and adhesive is made strong by penetrating the adhesive into the cord and further diffusing adhesive component monomer and oligomer into fiber molecules. Then, the bonding between the thus treated cord and rubber composition is made strong by mutually diffusing the rubber composition and the adhesive because the resinification of the adhesive is insufficient, and completing the resinification reaction of the adhesive through the bismaleimide compound contained in the rubber composition and acting the bismaleimide compound itself as an adhesive. The improvement of the bonding force through such an adhesion mechanism is first found in the invention.

Moreover, there has already been known an attempt for improving the properties by merely compounding the bismaleimide compound into the rubber composition. For example, Japanese Patent laid open No. 61-238,501 discloses that the rubber composition containing 0.3 ~ 5 phr of a particular vulcanization accelerator, 0.3 ~ 3 phr of sulfur and 0.1 ~ 1.5 phr of bismaleimide compound and having a weight ratio of each of sulfur/bismaleimide compound and vulcanization accelerator/bismaleimide compound of 1/3 ~ 3/1 can improve the blow-out property without damaging the wear resistance and gripping property. However, this article does not disclose the improvement of cord adhesion at all. Furthermore, Japanese Patent laid open No. 61-14,238 discloses that the rubber composition containing 0.5 ~ 10 phr of bismaleimide compound, about 0.5 ~ 5 phr of dibenzothiazyldisulfide and/or tetraalkyl-thiuramdisulfide and about 0.1 ~ 1.5 phr of sulfur and/or sulfur donor does not cause reversion even at high temperature vulcanization and provides an excellent tensile strength, but does not disclose the cord adhesion. Moreover, Japanese Patent laid open No. 61-166,844 discloses that the rubber composition having excellent heat aging resistance and bending crack resistance is obtained by compounding bismaleimides, sulfeneamides, dithiophosphoric acids and sulfur, but doe not also disclose the cord adhesion.

As to the adhesion between dipped cord and rubber, it is reported in International Polymer Science and Technology, vol. 11, No. 12, page 32 (1984) that the bonding force to nylon cord is improved in a rubber composition containing 3 parts by weight of m-phenylene bismaleimide and maintained even at 100° C., but the details on the adhesion treatment of cord are not described at all.

According to the invention, it is required to add 0.5 ~ 10 parts by weight of the bismaleimide compound to 100 parts by weight of rubber component. When the additional amount is less than 0.5 part by weight, the effect of improving the adhesion is small. When it exceeds 10 parts by weight, the adhesion is not remarkably and economically improved even by using such a great amount of expensive compound and also the Mooney viscosity of unvulcanized rubber is largely raised to deteriorate the workability and the tear strength of rubber is largely decreased and further the crack growth becomes large in case of applying dynamic strain input. On the other hand, it is also required to add 0.5 ~ 10 parts by weight of sulfur to 100 parts by weight of rubber component. When the amount of sulfur is less than 0.5 part by weight, the bonding force and vulcanization properties of rubber lower, while when it exceeds 10 parts by weight, the hardness of vulcanized rubber becomes too large to reduce the elongation at break, and not only the bonding force at room temperature is lowered but also the bonding force at the high temperature is maximized to degrade the heat aging resistance and the like of rubber. Preferably, the amounts of bismaleimide compound and sulfur are 1 ~ 6 parts by weight and 2 ~ 6 parts by weight, respectively.

The epoxy compound used in the adhesion treatment of the cord for rubber reinforcement is not particularly restricted, but is preferably selected from the compounds having the following general formula:

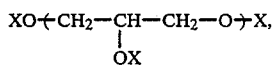

wherein X is independently a hydrogen atom or group

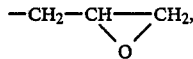

provided that the molecule has at least two latter groups, and n is an integer of not less than 1. Such an epoxy compound is obtained, for example, by reacting epichlorohydrin

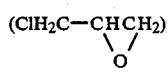

with an aliphatic polyvalent alcohol such as glycerin, ethylene glycol, propylene glycol or the like. The epoxy compound is preferable to have two or more epoxy rings in its molecule. Furthermore, there may be used liquid rubbers having an epoxy group in their molecular chain or molecular chain terminal, such as epoxidized liquid polybutadiene rubber, epoxidized liquid polyisoprene rubber and so on. Moreover, the epoxy compound is preferably adhered to the cord in an amount of 0.01~0.5part by weight per 100 parts by weight of the cord for the rubber reinforcement for obtaining the good adhesion.

The following examples are given in illustration of the invention and are not intended as limitations thereof.

Kevlar Fiber

Two yarns of Kevlar (trade name of aramid fiber, made by DuPont) with 1,500 deniers were twisted to form a cord. The aramid fiber cords were dipped into a treating liquid A having the following chemical composition, dried at 120° C. for 120 seconds, baked at 200° C. for 60 seconds, and then dipped into a treating liquid B having the following chemical composition to thereby perform adhesion treatment.

| Treating liquid A | | |
|---|---|---|
| diglycerol triglycidylether | 1.20 | (part by weight) |
| 70% solution of sodium dioctylsulfosuccinate | 0.02 | |
| 10% solution of sodium hydroxide | 0.14 | |
| soft water | 98.64 | |
| total | 100 | |
| Treating liquid B | | |
| soft water | 70.1 | (part by weight) |
| resorcin | 1.5 | |
| 37% formalin | 1.7 | |
| 10% solution of sodium hydroxide | 1.7 | |
| VP-latex (40%) | 19 | |
| SBR-latex (40%) | 6 | |
| total | 100 | |

Moreover, the mol ratio of resorcin to formaldehyde in the treating liquid B was 0.65.

The aramid fiber cords subjected to the aforementioned adhesion treatment were embedded into a rubber composition having a compounding recipe as shown in the following Tables 1 and 2 and then vulcanized at 145° C. under a pressure of 20 kg/cm² for 30 minutes.

TABLE 1

| | Run No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| natural rubber | 100 | 100 | 100 | 100 | 100 | 100 | 100 | 100 | 100 | 100 | 100 | 100 | 100 | 100 | 100 | 100 |
| carbon black HAF | 42 | 42 | 42 | 42 | 42 | 42 | 42 | 42 | 42 | 42 | 42 | 42 | 42 | 42 | 42 | 42 |
| stearic acid | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| zinc white | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| antioxidant* | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| dibenzothiazyl disulfide | 0.6 | 0.6 | 0.6 | 0.6 | 0.6 | 1.0 | 0.6 | 0.6 | 0.6 | 0.6 | 0.6 | 0 | 0 | 0 | 0.6 | 0.6 |
| N—oxydiethylene benzothiazylsulfeneamide | 0.4 | 0.4 | 0.4 | 0.4 | 0.4 | 0 | 0.4 | 0.4 | 0.4 | 0.4 | 0.4 | 0 | 0 | 0 | 0.4 | 0.4 |
| cyclohexyl benzothiazylsulfeneamide | 0 | 0 | 0 | 0 | 0 | 0 | 0 | 0 | 0 | 0 | 0 | 0.8 | 0.8 | 0.8 | 0 | 0 |
| N,N'—m-phenylene bismaleimide | 0 | 1.0 | 2.0 | 3.0 | 9.0 | 4.0 | 3.0 | 0 | 1.5 | 3.0 | 6.0 | 2.0 | 2.0 | 2.0 | 2.0 | 11.0 |
| sulfur | 2.8 | 2.8 | 2.8 | 2.8 | 2.8 | 0 | 1.0 | 6.0 | 6.0 | 6.0 | 6.0 | 2.8 | 1.5 | 6.0 | 12.0 | 2.8 |

*... 1,2-dihydro-2,2,4-trimethylquinoline

TABLE 2

| | Run No. | | | | | | | | | | | |
|---|---|---|---|---|---|---|---|---|---|---|---|---|
| | 17 | 18 | 19 | 20 | 21 | 22 | 23 | 24 | 25 | 26 | 27 | 28 |
| natural rubber | 80 | 80 | 100 | 100 | 100 | 100 | 100 | 100 | 100 | 100 | 80 | 80 |
| polybutaidne (BR01) | 0 | 0 | 0 | 0 | 0 | 0 | 0 | 0 | 0 | 0 | 20 | 20 |
| styrene-butadiene rubber (SBR1500) | 20 | 20 | 0 | 0 | 0 | 0 | 0 | 0 | 0 | 0 | 0 | 0 |
| carbon black HAF | 45 | 45 | 42 | 42 | 42 | 42 | 42 | 42 | 42 | 42 | 42 | 42 |
| zinc white | 7.5 | 7.5 | 5 | 5 | 5 | 5 | 5 | 5 | 5 | 5 | 5 | 5 |
| stearic acid | 2.0 | 2.0 | 1.2 | 1.2 | 1.2 | 1.2 | 1.2 | 1.2 | 1.2 | 1.2 | 1.2 | 1.2 |
| process oil | 12.0 | 12.0 | 0 | 0 | 0 | 0 | 0 | 0 | 0 | 0 | 0 | 0 |
| antioxidant* | 0.7 | 0.7 | 0.7 | 0.7 | 0.7 | 0.7 | 0.7 | 0.7 | 0.7 | 0.7 | 0.7 | 0.7 |
| vulcanization accelerator dibenzothiazyl disulfide | 0.3 | 0.3 | 0.6 | 0.6 | 0.6 | 0.6 | 0.6 | 0.6 | 0.6 | 0.6 | 0 | 0 |
| N—oxydiethylene benzothiazyl-2-sulfeneamide | 0.4 | 0.4 | 0.4 | 0.4 | 0.4 | 0.4 | 0.4 | 0.4 | 0.4 | 0.4 | 0 | 0 |
| dicyclohexyl benzothiazyl | 0 | 0 | 0 | 0 | 0 | 0 | 0 | 0 | 0 | 0 | 0.8 | 0.8 |

TABLE 2-continued

| | Run No. | | | | | | | | | | | |
|---|---|---|---|---|---|---|---|---|---|---|---|---|
| | 17 | 18 | 19 | 20 | 21 | 22 | 23 | 24 | 25 | 26 | 27 | 28 |
| sulfeneamide | | | | | | | | | | | | |
| sulfur | 3.0 | 3.0 | 2.8 | 2.8 | 2.8 | 2.8 | 2.8 | 2.8 | 2.8 | 2.8 | 2.8 | 2.8 |
| N,N'—m-phenylene bismaleimide | 0 | 2.5 | 0 | 2.0 | 0 | 0 | 0 | 0 | 0 | 0 | 0 | 3.0 |
| N,N—hexamethylene bismaleimide | 0 | 0 | 0 | 0 | 2.0 | 0 | 0 | 0 | 0 | 0 | 0 | 0 |
| N,N'—ethylene bismaleimide | 0 | 0 | 0 | 0 | 0 | 2.0 | 0 | 0 | 0 | 0 | 0 | 0 |
| N,N'—p-phenylene bismaleimide | 0 | 0 | 0 | 0 | 0 | 0 | 2.0 | 0 | 0 | 0 | 0 | 0 |
| N,N'—4,4'-diphenylmethane bismaleimide | 0 | 0 | 0 | 0 | 0 | 0 | 0 | 3.0 | 0 | 0 | 0 | 0 |
| mixture of N,N'—(2,4-toluylene) bismaleimide and N,N'—(2,6-toluylene) bismaleimide | 0 | 0 | 0 | 0 | 0 | 0 | 0 | 0 | 2.0 | 0 | 0 | 0 |
| N,N'—(1,4-butanediol bis-3-aminopropyl ether) bismaleimide | 0 | 0 | 0 | 0 | 0 | 0 | 0 | 0 | 0 | 2.0 | 0 | 0 |

*... 1,2-dihydro-2,2,4-trimethylquinoline

The cord was peeled from the resulting vulcanizate to measure the peeling resistance. In this case, the peeling resistance was calculated as an adhesion index by the following equation on the basis that Run No. 1 in Table 1 and Run No. 17 in Table 2 were 100 as a control, respectively.

$$\text{Adhesion index} = \frac{\text{peeling resistance of sample vulcanizate}}{\text{peeling resistance of control vulcanizate}} \times 100$$

The larger the numerical value, the higher the bonding force.

The obtained results are shown in the following Table 3.

Preparation of treating liquid C 0.5 mol of resorcin was dissolved into 500 g of toluene, to which was added 0.25 mol of sulfur monochloride dropwise at a rate of 0.15 ml/min at a temperature of 25° C. with stirring. After the completion of the addition, the resulting solution was left to stand until the generation of chlorine gas finished. Then, toluene was removed under a reduced pressure and then the resulting substituted phenol condensate was dissolved into methyl alcohol. Separately, 1 mol of resorcin was dissolved in 50 g of water and mixed with 0.5 mol of 37% formaldehyde, which was reacted at a temperature of 50°~60° C. for several hours to obtain a resorcin excessive resorcin-formaldehyde initial condensate and dissolved into methyl alcohol. The thus obtained two

TABLE 3

| Adhesion index | Run No. 1 | Run No. 2 | Run No. 3 | Run No. 4 | Run No. 5 | Run No. 6 | Run No. 7 | Run No. 8 | Run No. 9 |
|---|---|---|---|---|---|---|---|---|---|
| measurement at room temperature | 100 | 345 | 421 | 403 | 226 | 190 | 459 | 128 | 345 |
| measurement at 150° C. | 100 | 681 | 885 | 808 | 434 | 292 | 961 | 159 | 577 |

| Adhesion index | Run No. 10 | Run No. 11 | Run No. 12 | Run No. 13 | Run No. 14 | Run No. 15 | Run No. 16 | Run No. 17 | Run No. 18 | Run No. 19 |
|---|---|---|---|---|---|---|---|---|---|---|
| measurement at room temperature | 324 | 297 | 414 | 479 | 253 | 201 | 212 | 100 | 176 | 100 |
| measurement at 150° C. | 654 | 609 | 731 | 885 | 530 | 316 | 426 | 100 | 575 | 100 |

| Adhesion index | Run No. 20 | Run No. 21 | Run No. 22 | Run No. 23 | Run No. 24 | Run No. 25 | Run No. 26 | Run No. 27 | Run No. 28 |
|---|---|---|---|---|---|---|---|---|---|
| measurement at room temperature | 345 | 292 | 297 | 284 | 270 | 313 | 302 | 108 | 341 |
| measurement at 150° C. | 681 | 597 | 517 | 543 | 455 | 630 | 583 | 99 | 676 |

As seen from the results of Table 3, the adhesion properties are considerably improved in the rubber-cord composite bodies each consisting of Kevlar fiber cord treated with the treating liquid A containing the epoxy compound and further with the RFL adhesive having the usual R/F mol ratio (0.65) and the rubber composition according to the invention.

Polyethylene Terephthalate Fiber

Two polyethylene terephthalate fiber yarns of 1,500 deniers were twisted to form a cord. The polyethylene terephthalate fiber cords were dipped into a treating liquid C prepared as mentioned later, dried at 150° C. for 90 seconds, and baked at 240° C. for 120 seconds to obtain adhesion-treated cords.

methyl alcohol solutions were mixed at a mixing ratio of 100:20 as a solid content and then methyl alcohol was completely removed under a reduced pressure. The thus obtained resin matter was dissolved in a 5% aqueous ammonia solution at a concentration of 15% to obtain an aqueous solution of resorcin resin C-1.

On the other hand, the following ingredients were mixed at the following compounding recipe (part by weight) and aged at room temperature for 24 hours to obtain a treating liquid C-2.

| Treating liquid C-2 | |
|---|---|
| soft water | 519.0 |
| resorcin | 11.0 |
| 37% formalin | 16.2 |
| 28% aqueous ammonia solution | 10.0 |

| -continued |  |
|---|---|
| Treating liquid C-2 | |
| VP-latex (40%) | 244.0 |

The resorcin resin solution C-1 and the treating liquid C-2 were mixed at a weight ratio of 1.0 as a solid content to obtain a treating liquid C.

Moreover, the mol ratio of R/F in the treating liquid C was not less than 1.0.

The polyethylene terephthalate fiber cords subjected to the adhesion treatment as mentioned above were embedded into a rubber composition corresponding to Run No. 17 and Run Nos. 18, 25 and 26 of Table 2 and then vulcanized under pressure in the same manner as in Run No. 2.

The cord was peeled from the vulcanizate and then the peeling resistance was measured as an adhesion index in the same manner as described in Run No. 2 to obtain results as shown in the following Table 4.

TABLE 4

| Adhesion index | Run No. 17 | Run No. 18 | Run No. 25 | Run No. 26 |
|---|---|---|---|---|
| Measurement at room temperature | 100 | 141 | 138 | 135 |
| Measurement at 150° C. | 100 | 267 | 255 | 240 |

As seen from the results of Table 4, when the polyethylene terephthalate fiber cords are treated with the treating liquid C having an R/F mol ratio of not less than 1.0 without using the treating liquid A, the rubber-cord composite body obtained by embedding such treated cords into the rubber composition according to the invention exhibits an excellent bonding force.

Aromatic Polyester Fiber

Two aromatic polyester fiber yarns of 1,500 deniers were twisted to form a cord. The full-aromatic polyester fiber was composed of a copolymerized polyester consisting of monomer units represented by

wherein Ar₁ is

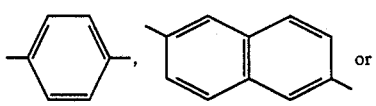

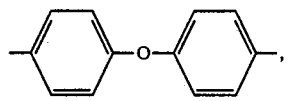

and Ar₂ is

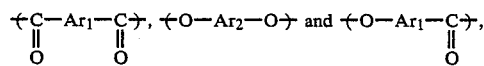

and R is

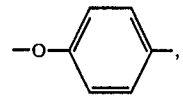

an alkyl group or a halogen atom, or a copolymerized polyester consisting mainly of these monomer units.

Then, the aromatic polyester fiber cords, for example, EKONOL made by Carborundum Co., as a trade name, were dipped into the treating liquid A, dried at 160° C. for 60 seconds, baked at 240° C. for 120 seconds, dipped into the treating liquid B, dried at 240° C. for 60 seconds and baked at 240° C. for 120 seconds to obtain adhesion-treated cords.

The aromatic polyester fiber cords subjected to the adhesion treatment as mentioned above were embedded into a rubber composition corresponding to Run No. 17 and Run No. 18 of Table 2 and then the peeling resistance of the vulcanizate was measured as an adhesion index in the same manner as in Run No. 2 to obtain results as shown in the following Table 5.

TABLE 5

| Adhesion index | Run No. 17 | Run No. 18 |
|---|---|---|
| Measurement at room temperature | 100 | 187 |
| Measurement at 150° C. | 100 | 563 |

As seen from the results of Table 5, when the aromatic polyester fiber cord is treated with the treating liquids A and B likewise the case of Kevlar fiber cord, the rubber-cord composite body obtained by embedding such treated cords in the rubber composition according to the invention exhibits a very excellent bonding force.

The effect of the combination of the adhesive treating liquid and the rubber composition will be described in detail below.

The bonding force at 150° C. in each of the aforementioned fibers was measured by using the treating liquids A and B and the rubber compositions of Run No. 1 and Run No. 2 to obtain results as shown in the following Tables 6(a)~(e). Moreover, the bonding force has indicated by the same index as mentioned above.

TABLE 6(a)

| | Kevlar fiber cord | |
|---|---|---|
| | Rubber composition | |
| Treating method | Run No. 1 | Run No. 2 |
| Treating liquid B alone | 23 | 45 |
| Treating liquid A → Treating liquid B | 100 | 786 |

TABLE 6(b)

| | Rayon fiber cord | |
|---|---|---|
| | Rubber composition | |
| Treating method | Run No. 1 | Run No. 2 |
| Treating liquid B alone | 78 | 86 |
| Treating liquid A → Treating liquid B | 100 | 160 |

TABLE 6(c)

| | Polyethylene terephthalate fiber cord | |
|---|---|---|
| | Rubber composition | |
| Treating method | Run No. 1 | Run No. 2 |
| Treating liquid B alone | 67 | 72 |
| Treating liquid A → Treating liquid B | 100 | 205 |

TABLE 6(d)

| | Aromatic polyester fiber cord | |
|---|---|---|
| | Rubber composition | |
| Treating method | Run No. 1 | Run No. 2 |
| Treating liquid B alone | 67 | 75 |
| Treating liquid A → Treating liquid B | 100 | 467 |

TABLE 6(e)

| | Nylon fiber cord | |
|---|---|---|
| | Rubber composition | |
| Treating method | Run No. 1 | Run No. 2 |
| Treating liquid B alone | 75 | 81 |
| Treating liquid A → Treating liquid B | 100 | 176 |

As seen from the results of Tables 6(a)~(e), the high bonding force is obtained by combining the cords treated with the treating liquids A and B with the rubber composition of Run No. 2 irrespective of the kind of the fiber.

As mentioned above, in the rubber-cord composite bodies according to the invention, the bonding force between rubber and cord is largely enhanced by combining the particular adhesion treatment with the particular rubber composition.

What is claimed is:

1. A rubber-cord composite body, characterized in that fiber cords for rubber reinforcement treated with an epoxy compound and further with an adhesive composed of resorcin, formaldehyde and rubber latex having a mol ratio of resorcin to formaldehyde of less than 1.0 are embedded in a rubber composition containing 0.5~10 parts by weight of a bismaleimide compound and 0.5~10 parts by weight of a bismaleimide compound and 0.5~10 parts by weight of sulfur based on 100 parts by weight of starting rubber.

2. The rubber-cord composite body according to claim 1, wherein said resorcin is selected from resorcin and resorcin derivatives.

3. The rubber-cord composite body according to claim 1, wherein said rubber latex is selected from vinyl pyridine-styrene-butadiene copolymer latex, styrene-butadiene copolymer latex, carboxy-modified latex and natural rubber latex.

4. The rubber-cord composite body according to claim 1, wherein said starting rubber is selected from natural rubber, synthetic rubber and a blend thereof.

5. The rubber-cord composite body according to claim 1, wherein said bismaleimide compound has the following general formula:

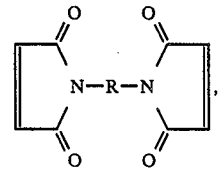

in which R is an aromatic, aliphatic or alicyclic hydrocarbon rediue.

6. The rubber-cord composite body according to claim 5, wherein said bismaleimide compound is selected from N,N'-ethylene bismaleimide, N,N'-hexamethylene bismaleimide, N,N'-dodecamethylene bismaleimide, N,N'-(2,2,4-trimethylhexamethylene) bismaleimide, N,N'-(oxydipropylene) bismaleimide, N,N'-(amino-dipropylene) bismaleimide, N,N'-(ethylenedioxydipropylene) bismaleimide, N,N'-(1,4-cyclohexylene) bismaleimide, N,N'-(1,3-cyclohexylene) bismaleimide, N,N'-(methylene1,4-dicyclohexylene) bismaleimide, N,N'-(isopropylidene1,4-dicyclohexylene) bismaleimide, N,N'-(m-phenylene) bismaleimide, N,N'-(p-phenylene) bismaleimide, N,N'-(ophenylene) bismaleimide, N,N'-(1,3-naphthylene) bismaleimide, N,N'-(1,4-naphthylene) bismaleimide, N,N'-(1,5-naphthylene) bismaleimide, N,N'-(3,3'-dimethyl4,4'-biphenylene) bismaleimide, N,N'-(3,3'-dichloro4,4'-biphenylene) bismaleimide, N,N'-(2,4-pyridyl) bismaleimide. N,N'-(2,4-toluylene) bismaleimide, N,N'-(2,6-toluylene) bismaleimide, N,N'-(4,6 dimethyl 1,3-phenylene) bismaleimide, N,N'-(4,4'-diphenylmethane) bismaleimide, N,N'-(4,4'-diphenylether) bismaleimide, N,N'-(4,4'-diphenylsulfone) bismaleimide, N,N'-(4,4'-diphenyldithio) bismaleimide, N,N'-(1,4-butanediol bis-3-aminopropyl ether) bismaleimide, N,N'-(1,4-ethanediol bis-3-aminopropyl ether) bismaleimide, N,N'-(p-diamino diphenyl ether) bismaleimide and a mixture thereof.

7. The rubber-cord composite body according to claim 1, wherein said rubber composition contains 1~6 parts by weight of said bismaleimide compound and 2~6 parts by weight of said sulfur.

* * * * *